United States Patent
Atkuri et al.

(10) Patent No.: US 11,474,385 B1
(45) Date of Patent: Oct. 18, 2022

(54) ELECTRICALLY CONTROLLABLE PRIVACY GLAZING WITH ULTRALOW POWER CONSUMPTION COMPRISING A LIQUID CRYSTAL MATERIAL HAVING A LIGHT TRANSMITTANCE THAT VARIES IN RESPONSE TO APPLICATION OF AN ELECTRIC FIELD

(71) Applicant: Cardinal IG Company, Eden Prairie, MN (US)

(72) Inventors: Hari Atkuri, Plymouth, MN (US); Eric Bjergaard, Minneapolis, MN (US)

(73) Assignee: Cardinal IG Company, Eden Prairie, MN (US)

( * ) Notice: Subject to any disclaimer, the term of this patent is extended or adjusted under 35 U.S.C. 154(b) by 5 days.

(21) Appl. No.: 16/700,784

(22) Filed: Dec. 2, 2019

Related U.S. Application Data

(60) Provisional application No. 62/774,320, filed on Dec. 2, 2018.

(51) Int. Cl.
  *G02F 1/133* (2006.01)
  *G02F 1/1343* (2006.01)
  *G02F 1/163* (2006.01)

(52) U.S. Cl.
  CPC ........ *G02F 1/13306* (2013.01); *G02F 1/1343* (2013.01); *G02F 1/163* (2013.01)

(58) Field of Classification Search
  CPC ......... G02F 1/163; G02F 1/15; G02F 1/13775
  See application file for complete search history.

(56) References Cited

U.S. PATENT DOCUMENTS

| | | |
|---|---|---|
| 3,951,846 A | 4/1976 | Gavrilovic |
| 3,953,630 A | 4/1976 | Roberts et al. |
| 4,047,351 A | 9/1977 | Derner et al. |
| 4,150,877 A | 4/1979 | Kobale et al. |

(Continued)

FOREIGN PATENT DOCUMENTS

| | | |
|---|---|---|
| CN | 201226062 Y | 4/2009 |
| CN | 101775953 A | 7/2010 |

(Continued)

OTHER PUBLICATIONS

Bortolozzo et al., Abstract of "Transmissive Liquid Crystal Light-valve for Near-Infrared Applications," Appl. Opt., 52(22), Aug. 2013, accessed on the internet at https://www.osapublishing.org/ao/abstract.cfm?uri=ao-52-22-E73, retrieved Sep. 26, 2019, 2 pages.

*Primary Examiner* — Paul C Lee
(74) *Attorney, Agent, or Firm* — Fredrikson & Byron, P.A.

(57) ABSTRACT

An electrically dynamic window structure may include first and second panes of transparent material and an electrically controllable optically active material positioned between the two panes. A driver can be electrically connected to electrode layers carried by the two panes. The driver may be configured to alternate between a drive phase in which a drive signal is applied to the electrode layers and an idle phase in which the drive signal is not applied to the electrode layers. The electrically controllable optically active material can maintain its transition state during the idle phase. As a result, the power consumption of the structure may be reduced as compared to if the driver continuously delivers the drive signal.

20 Claims, 6 Drawing Sheets

(56) References Cited

U.S. PATENT DOCUMENTS

| | | | |
|---|---|---|---|
| 4,277,294 A | 7/1981 | Orcutt | |
| 4,284,677 A | 8/1981 | Herliczek | |
| 4,465,340 A | 8/1984 | Suganuma | |
| 4,587,784 A | 5/1986 | Chavy et al. | |
| 4,614,676 A | 9/1986 | Rehfeld | |
| 4,702,566 A | 10/1987 | Tukude | |
| 4,749,261 A | 6/1988 | Mclaughlin et al. | |
| 4,932,608 A | 6/1990 | Heidish et al. | |
| 4,958,917 A | 9/1990 | Hashimoto et al. | |
| 5,076,673 A | 12/1991 | Lynam et al. | |
| 5,103,336 A | 4/1992 | Sieloff | |
| 5,111,329 A | 5/1992 | Gajewski et al. | |
| 5,111,629 A | 5/1992 | Baughman et al. | |
| 5,142,644 A | 8/1992 | Vansteenkiste et al. | |
| 5,151,824 A | 9/1992 | O'Farrell | |
| 5,154,953 A | 10/1992 | De Moncuit et al. | |
| 5,164,853 A | 11/1992 | Shimazaki | |
| 5,168,387 A | 12/1992 | Asakura et al. | |
| 5,197,242 A | 3/1993 | Baughman et al. | |
| 5,202,787 A | 4/1993 | Byker et al. | |
| 5,239,406 A | 8/1993 | Lynam | |
| 5,244,557 A | 9/1993 | Defendini et al. | |
| 5,336,925 A * | 8/1994 | Moss | G03F 7/039 257/643 |
| 5,408,353 A | 4/1995 | Nichols et al. | |
| 5,589,958 A | 12/1996 | Lieb | |
| 5,643,644 A | 7/1997 | Demars | |
| 5,668,663 A | 9/1997 | Varaprasad et al. | |
| 5,766,755 A | 6/1998 | Chaussade et al. | |
| 5,796,452 A | 8/1998 | Pierson | |
| 5,855,638 A | 1/1999 | Demars | |
| 5,889,608 A | 3/1999 | Buffat et al. | |
| 6,001,487 A | 12/1999 | Ladang et al. | |
| 6,055,088 A | 4/2000 | Fix et al. | |
| 6,061,105 A | 5/2000 | Nakagawa | |
| 6,064,509 A | 5/2000 | Tonar et al. | |
| 6,143,209 A | 11/2000 | Lynam | |
| 6,261,652 B1 | 7/2001 | Poix et al. | |
| 6,280,041 B1 | 8/2001 | Unger et al. | |
| 6,297,900 B1 | 10/2001 | Tulloch et al. | |
| 6,317,248 B1 | 11/2001 | Agrawal et al. | |
| 6,340,963 B1 | 1/2002 | Anno et al. | |
| 6,366,391 B1 | 4/2002 | Hurtz | |
| 6,373,618 B1 | 4/2002 | Agrawal et al. | |
| 6,407,847 B1 | 6/2002 | Poll et al. | |
| 6,466,298 B1 | 10/2002 | Fix et al. | |
| 6,486,928 B1 | 11/2002 | Lin et al. | |
| 6,567,708 B1 | 5/2003 | Bechtel et al. | |
| 6,589,613 B1 | 7/2003 | Kunert | |
| 6,594,067 B2 | 7/2003 | Poll et al. | |
| 6,621,534 B2 | 9/2003 | Lin et al. | |
| 6,639,708 B2 | 10/2003 | Elkadi et al. | |
| 6,643,050 B2 | 11/2003 | Rukavina et al. | |
| 6,671,008 B1 | 12/2003 | Li et al. | |
| 6,671,080 B2 | 12/2003 | Poll et al. | |
| 6,795,226 B2 | 9/2004 | Agrawal et al. | |
| 6,819,467 B2 | 11/2004 | Lynam | |
| 6,829,074 B2 | 12/2004 | Terada et al. | |
| 6,829,511 B2 | 12/2004 | Bechtel et al. | |
| 6,842,276 B2 | 1/2005 | Poll et al. | |
| 6,928,311 B1 * | 8/2005 | Pawluczyk | A61B 5/0002 600/310 |
| 6,950,221 B1 | 9/2005 | Terada et al. | |
| 7,002,720 B2 | 2/2006 | Beteille et al. | |
| 7,009,665 B2 | 3/2006 | Li et al. | |
| 7,023,600 B2 | 4/2006 | Mallya et al. | |
| 7,033,655 B2 | 4/2006 | Beteille et al. | |
| 7,081,929 B2 | 7/2006 | Furuki et al. | |
| 7,085,609 B2 | 8/2006 | Bechtel et al. | |
| 7,173,750 B2 | 2/2007 | Rukavina | |
| 7,230,748 B2 | 6/2007 | Giron et al. | |
| 7,300,166 B2 | 11/2007 | Agrawal et al. | |
| 7,423,664 B2 | 9/2008 | Ukawa | |
| 7,502,156 B2 | 3/2009 | Tonar et al. | |
| 7,505,188 B2 | 3/2009 | Niiyama et al. | |
| 7,525,714 B2 | 4/2009 | Poll et al. | |
| 7,542,809 B2 | 6/2009 | Bechtel et al. | |
| 7,671,948 B2 | 3/2010 | Ninomiya | |
| 7,719,751 B2 | 5/2010 | Egerton et al. | |
| 7,738,155 B2 | 6/2010 | Agrawal et al. | |
| 7,746,534 B2 | 6/2010 | Tonar et al. | |
| 7,817,327 B2 | 10/2010 | Derda | |
| 7,822,490 B2 | 10/2010 | Bechtel et al. | |
| 7,872,791 B2 | 1/2011 | Karmhag et al. | |
| 7,876,400 B2 | 1/2011 | Baliga et al. | |
| 7,906,203 B2 | 3/2011 | Hartig | |
| 7,960,854 B2 | 6/2011 | Paulus et al. | |
| 7,990,603 B2 | 8/2011 | Ash et al. | |
| 8,102,478 B2 | 1/2012 | Xue | |
| 8,164,818 B2 | 4/2012 | Collins et al. | |
| 8,169,587 B2 | 5/2012 | Bolton | |
| 8,187,682 B2 | 5/2012 | Albrecht et al. | |
| 8,189,254 B2 | 5/2012 | Voss et al. | |
| 8,199,264 B2 | 6/2012 | Veerasamy | |
| 8,213,074 B1 | 7/2012 | Shrivastava et al. | |
| 8,218,224 B2 | 7/2012 | Kwak et al. | |
| 8,219,217 B2 | 7/2012 | Bechtel et al. | |
| 8,263,228 B2 | 9/2012 | Torr | |
| 8,289,609 B2 | 10/2012 | Lamine et al. | |
| 8,343,571 B2 | 1/2013 | Werners et al. | |
| 8,355,112 B2 | 1/2013 | Bolton | |
| 8,482,838 B2 | 7/2013 | Sbar et al. | |
| 8,547,624 B2 | 10/2013 | Ash et al. | |
| 8,551,603 B2 | 10/2013 | Thompson | |
| 8,610,992 B2 | 12/2013 | Varaprasad et al. | |
| 8,619,204 B2 | 12/2013 | Saitoh et al. | |
| 8,643,933 B2 | 2/2014 | Brown | |
| 8,711,465 B2 | 4/2014 | Bhatnagar et al. | |
| 8,810,889 B2 | 8/2014 | Brown | |
| 8,869,493 B2 | 10/2014 | Chubb et al. | |
| 8,913,215 B2 | 12/2014 | Yang et al. | |
| 8,941,788 B2 | 1/2015 | Brecht et al. | |
| 8,970,810 B2 | 3/2015 | Bowser et al. | |
| 8,975,789 B2 | 3/2015 | Snyker et al. | |
| 8,995,039 B2 | 3/2015 | Bartug et al. | |
| 9,019,588 B2 | 4/2015 | Brown et al. | |
| 9,036,242 B2 | 5/2015 | Bergh et al. | |
| 9,091,868 B2 | 7/2015 | Bergh et al. | |
| 9,097,842 B2 | 8/2015 | Van Nutt et al. | |
| 9,102,124 B2 | 8/2015 | Collins et al. | |
| 9,128,346 B2 | 9/2015 | Shrivastava et al. | |
| 9,158,173 B2 | 10/2015 | Bhatnagar et al. | |
| 9,176,357 B2 | 11/2015 | Lam et al. | |
| 9,193,135 B2 | 11/2015 | Boote et al. | |
| 9,316,883 B2 | 4/2016 | Sbar et al. | |
| 9,333,728 B2 | 5/2016 | Veerasamy | |
| 9,341,015 B2 | 5/2016 | Fernando et al. | |
| 9,341,909 B2 | 5/2016 | Egerton et al. | |
| 9,389,454 B2 | 7/2016 | Yamaguchi et al. | |
| 9,400,411 B2 | 7/2016 | Poix et al. | |
| 9,436,054 B2 | 9/2016 | Brown et al. | |
| 9,436,055 B2 | 9/2016 | Shrivastava et al. | |
| 9,442,341 B2 | 9/2016 | Shrivastava et al. | |
| 9,477,130 B2 | 10/2016 | Dubrenat | |
| 9,494,717 B2 | 11/2016 | Reymond et al. | |
| 9,550,457 B2 | 1/2017 | Green et al. | |
| 9,568,799 B2 | 2/2017 | Lam et al. | |
| 9,581,877 B2 | 2/2017 | Bass et al. | |
| 9,606,411 B2 | 3/2017 | Bergh et al. | |
| 9,606,412 B2 | 3/2017 | Geerlings et al. | |
| 9,618,819 B2 | 4/2017 | Egerton et al. | |
| 9,618,820 B2 | 4/2017 | Conklin et al. | |
| 9,625,783 B2 | 4/2017 | Bjornard et al. | |
| 9,664,976 B2 | 5/2017 | Rozbicki | |
| 9,690,162 B2 | 6/2017 | Wilbur et al. | |
| 9,726,925 B2 | 8/2017 | Relot et al. | |
| 9,766,496 B2 | 9/2017 | Cammenga et al. | |
| 9,810,963 B2 | 11/2017 | Gauthier et al. | |
| 9,829,763 B2 | 11/2017 | Friedman et al. | |
| 9,857,657 B2 | 1/2018 | Ash et al. | |
| 9,891,454 B2 | 2/2018 | Zhang et al. | |
| 9,927,609 B2 | 3/2018 | Cammenga et al. | |
| 9,939,702 B2 | 4/2018 | Bjornard | |
| 9,952,481 B2 | 4/2018 | Rozbicki et al. | |

(56) References Cited

U.S. PATENT DOCUMENTS

| | | | |
|---|---|---|---|
| 9,958,750 B2 | 5/2018 | Parker et al. |
| 9,958,751 B2 | 5/2018 | Bergh et al. |
| 9,963,383 B2 | 5/2018 | Veerasamy |
| 9,971,194 B2 | 5/2018 | Brecht et al. |
| 9,989,822 B2 | 6/2018 | Galstian |
| 2004/0233379 A1 | 11/2004 | Kinoshita et al. |
| 2005/0002081 A1 | 1/2005 | Beteille et al. |
| 2005/0132558 A1 | 6/2005 | Hennessy et al. |
| 2005/0233125 A1 | 10/2005 | Anderson et al. |
| 2008/0089073 A1 | 4/2008 | Hikmet |
| 2008/0317977 A1 | 12/2008 | Wu |
| 2009/0246426 A1 | 10/2009 | Wu |
| 2009/0279004 A1 | 11/2009 | Greenall et al. |
| 2009/0303565 A1 | 12/2009 | Karmhag et al. |
| 2010/0028585 A1 | 2/2010 | Shimatani |
| 2010/0279125 A1 | 11/2010 | Buyuktanir et al. |
| 2011/0007253 A1 | 1/2011 | Stocq |
| 2011/0181820 A1 | 7/2011 | Watanabe |
| 2012/0033287 A1* | 2/2012 | Friedman ................ G02F 1/157 |
| | | | 359/275 |
| 2012/0086904 A1 | 4/2012 | Oki et al. |
| 2012/0094118 A1 | 4/2012 | Oki et al. |
| 2012/0327499 A1 | 12/2012 | Parker et al. |
| 2013/0107563 A1 | 5/2013 | McCabe et al. |
| 2013/0118918 A1 | 5/2013 | Servida |
| 2013/0265511 A1 | 10/2013 | Poix et al. |
| 2013/0271814 A1 | 10/2013 | Brown |
| 2014/0020851 A1 | 1/2014 | Ouzts et al. |
| 2014/0204294 A1 | 7/2014 | Lv |
| 2014/0211129 A1 | 7/2014 | Bowser et al. |
| 2014/0247475 A1 | 9/2014 | Parker et al. |
| 2015/0049270 A1 | 2/2015 | Zhang et al. |
| 2015/0049378 A1 | 2/2015 | Shrivastava et al. |
| 2015/0103389 A1 | 4/2015 | Klawuhn et al. |
| 2015/0116649 A1 | 4/2015 | Watanabe |
| 2015/0118869 A1 | 4/2015 | Brown et al. |
| 2015/0151613 A1 | 6/2015 | Weng |
| 2015/0219975 A1 | 8/2015 | Phillips et al. |
| 2015/0277165 A1 | 10/2015 | Burrows et al. |
| 2015/0346575 A1 | 12/2015 | Bhatnagar et al. |
| 2015/0370140 A1 | 12/2015 | Bertolini |
| 2015/0378189 A1 | 12/2015 | Kim et al. |
| 2016/0026061 A1 | 1/2016 | O'Keeffe |
| 2016/0033841 A1* | 2/2016 | Gauthier ................ G02F 1/1339 |
| | | | 359/245 |
| 2016/0085129 A1 | 3/2016 | Cammenga et al. |
| 2016/0085131 A1 | 3/2016 | Lam et al. |
| 2016/0096344 A1 | 4/2016 | Kurihara |
| 2016/0124284 A1 | 5/2016 | O'Keeffe |
| 2016/0138328 A1 | 5/2016 | Behmke et al. |
| 2016/0161818 A1 | 6/2016 | Gregard et al. |
| 2016/0187753 A1 | 6/2016 | Sbar et al. |
| 2016/0243773 A1 | 8/2016 | Wang |
| 2016/0312523 A1 | 10/2016 | Miyasaka et al. |
| 2016/0363831 A1 | 12/2016 | Ash et al. |
| 2016/0377951 A1 | 12/2016 | Harris |
| 2017/0028686 A1 | 2/2017 | Wilson et al. |
| 2017/0097554 A1* | 4/2017 | Shiota ................ G02F 1/13306 |
| 2017/0122028 A1 | 5/2017 | Suzuka et al. |
| 2017/0139302 A1 | 5/2017 | Tonar |
| 2017/0152702 A1 | 6/2017 | Chang et al. |
| 2017/0218686 A1 | 8/2017 | Galstian |
| 2017/0219908 A1 | 8/2017 | Brown et al. |
| 2017/0235204 A1* | 8/2017 | Bergh ................ E06B 9/24 |
| | | | 359/275 |
| 2017/0328121 A1 | 11/2017 | Purdy et al. |
| 2017/0371218 A1 | 12/2017 | Kailasam et al. |
| 2018/0011383 A1 | 1/2018 | Higashihara et al. |
| 2018/0095337 A1 | 4/2018 | Rozbicki et al. |
| 2018/0101080 A1 | 4/2018 | Gauthier et al. |
| 2018/0307111 A1 | 10/2018 | Le Houx et al. |
| 2019/0137796 A1 | 5/2019 | Bjergaard et al. |
| 2019/0346710 A1 | 11/2019 | Schleder et al. |

FOREIGN PATENT DOCUMENTS

| | | | | |
|---|---|---|---|---|
| CN | 203858432 U | 10/2014 | | |
| CN | 105044965 A | 11/2015 | | |
| CN | 105334656 A | 2/2016 | | |
| CN | 205176432 U | 4/2016 | | |
| CN | 104948080 B | 6/2016 | | |
| CN | 205297172 U | 6/2016 | | |
| CN | 205558664 U | 9/2016 | | |
| CN | 206035269 U | 3/2017 | | |
| CN | 206352460 U | 7/2017 | | |
| CN | 107288492 A | 10/2017 | | |
| CN | 107327250 A | 11/2017 | | |
| CN | 206737720 U | 12/2017 | | |
| CN | 206801372 U | 12/2017 | | |
| CN | 206848627 U | 1/2018 | | |
| CN | 207004397 U | 2/2018 | | |
| CN | 109251629 A * | 1/2019 | | |
| EP | 978620 A2 | 2/2000 | | |
| EP | 2093051 A1 | 8/2009 | | |
| EP | 2256545 A1 | 12/2010 | | |
| EP | 2860580 A1 | 4/2015 | | |
| FR | 2970679 A1 * | 7/2012 | ......... | G02F 1/13306 |
| FR | 2989319 A1 * | 10/2013 | ......... | G02F 1/13306 |
| GB | 2546987 A | 8/2017 | | |
| JP | 59150898 A * | 8/1984 | | |
| JP | S6271930 A | 4/1987 | | |
| JP | H01202713 A | 8/1989 | | |
| JP | 2004182484 A | 7/2004 | | |
| JP | 2017068196 A | 4/2017 | | |
| KR | 20130037600 A | 4/2013 | | |
| WO | 2005084378 A2 | 9/2005 | | |
| WO | 2008090438 A2 | 7/2008 | | |
| WO | 2010100807 A1 | 9/2010 | | |
| WO | 2012111715 A1 | 8/2012 | | |
| WO | 2014032023 A1 | 2/2014 | | |
| WO | 2015059029 A1 | 4/2015 | | |
| WO | 2015100419 A1 | 7/2015 | | |
| WO | 2015117736 A1 | 8/2015 | | |
| WO | 2016008375 A1 | 1/2016 | | |
| WO | 2016043164 A1 | 3/2016 | | |
| WO | 2017008881 A1 | 1/2017 | | |
| WO | 2017011268 A1 | 1/2017 | | |
| WO | 2017183692 A1 | 10/2017 | | |
| WO | 2018086400 A1 | 5/2018 | | |

* cited by examiner

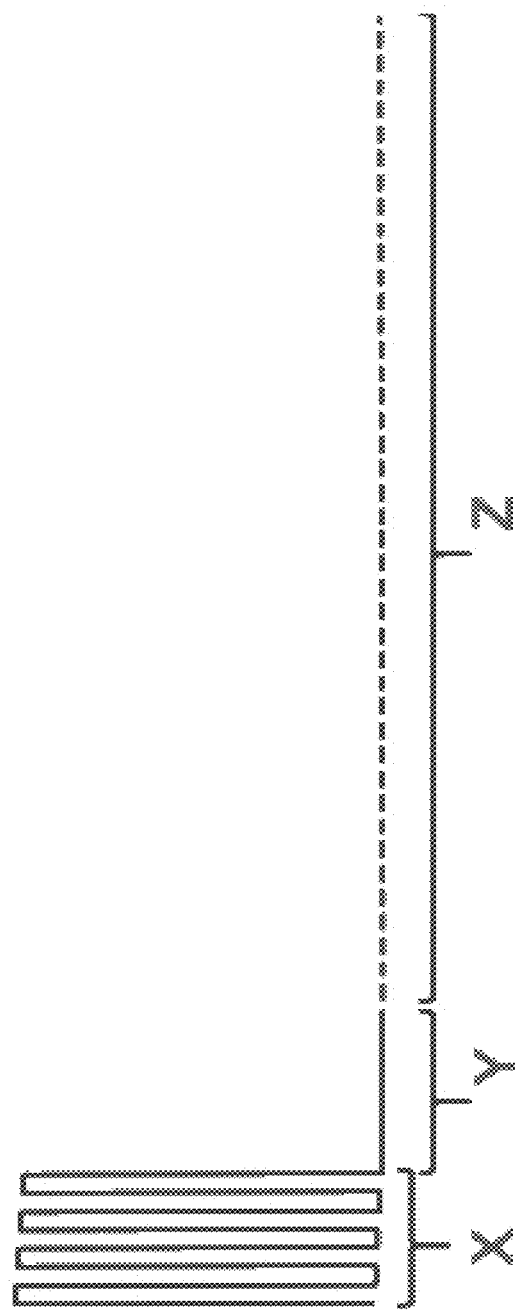

ELECTRICALLY CONTROLLABLE PRIVACY GLAZING WITH ULTRALOW POWER CONSUMPTION COMPRISING A LIQUID CRYSTAL MATERIAL HAVING A LIGHT TRANSMITTANCE THAT VARIES IN RESPONSE TO APPLICATION OF AN ELECTRIC FIELD

CROSS-REFERENCE

This application claims the benefit of U.S. Provisional Patent Application No. 62/774,320, filed Dec. 2, 2018, the entire contents of which are incorporated herein by reference.

TECHNICAL FIELD

This disclosure relates to structures that include an electrically controllable optically active material, including drivers and waveforms for controlling the electrically controllable optically active material.

BACKGROUND

Windows, doors, partitions, and other structures having controllable light modulation have been gaining popularity in the marketplace. These structures are commonly referred to as "smart" structures or "privacy" structures for their ability to transform from a transparent state in which a user can see through the structure to a private state in which viewing is inhibited through the structure. For example, smart windows are being used in high-end automobiles and homes and smart partitions are being used as walls in office spaces to provide controlled privacy and visual darkening.

A variety of different technologies can be used to provide controlled optical transmission for a smart structure. For example, electrochromic technologies, photochromic technologies, thermochromic technologies, suspended particle technologies, and liquid crystal technologies are all being used in different smart structure applications to provide controllable privacy. The technologies generally use an energy source, such as electricity, to transform from a transparent state to a privacy state or vice versa.

In practice, an electrical driver may be used to control or "drive" the optically active material. The driver may apply or cease applying electrical energy to the optically active material to transition between a transparent state and privacy state, or vice versa. In addition, the driver may apply an electrical signal to the optically active material once transitioned in a particular state to help maintain that state. For example, the driver may apply an electrical signal of alternating polarity to the optically active material to transition the optically active material between states and/or maintain the optically active material in a transitioned stated. When so configured, the process of changing the polarity of the structure from a first polarity to a second polarity may require discharging the structure from a voltage down to a zero voltage and then charging the structure from zero volts to an operating voltage at the opposite polarity. This consumes electrical energy impacting the overall energy efficiency of the structure.

SUMMARY

In general, this disclosure is directed to privacy structures incorporating an electrically controllable optically active material that provides controllable privacy. The privacy structures can be implemented in the form of a window, door, skylight, interior partition, or yet other structure where controllable visible transmittance is desired. In any case, the privacy structure may be fabricated from multiple panes of transparent material that include an electrically controllable medium between the panes. Each pane of transparent material can carry an electrode layer, which may be implemented as a layer of electrically conductive and optically transparent material deposited over the pane. The optically active material may be controlled, for example via an electrical driver communicatively coupled to the electrode layers, e.g., by controlling the application and/or removal of electrical energy to the optically active material. For example, the driver can control application and/or removal of electrical energy from the optically active material, thereby causing the optically active material to transition from a scattering state in which visibility through the structure is inhibited to a transparent state in which visibility through the structure is comparatively clear.

The electrical driver, which may also be referred to as a controller, may be designed to receive power from a power source, such as a rechargeable and/or replaceable battery and/or wall or mains power source. The electrical driver can condition the electricity received from the power source, e.g., by changing the frequency, amplitude, waveform, and/or other characteristic of the electricity received from the power source. The electrical driver can deliver the conditioned electrical signal to electrodes that are electrically coupled to the optically active material. In addition, in response to a user input or other control information, the electrical driver may change the conditioned electrical signal delivered to the electrodes and/or cease delivering electricity to the electrodes. Accordingly, the electrical driver can control the electrical signal delivered to the optically active material, thereby controlling the material to maintain a specific optical state or to transition from one state (e.g., a transparent state or scattering state) to another state.

In some configurations in accordance with the present disclosure, an electrical driver is configured to transition the electrically controllable optically active material to a particular transition state (e.g., scattering state or clear state) and then periodically alternate the polarity of the electrically controllable optically active material during a drive phase in that state. The drive can suspend driving of the electrically controllable optically active material between polarity reversal driving episodes, and the electrically controllable optically active material can hold its optical state between polarity reversal driving episodes.

Accordingly, instead of continuously driving the electrically controllable optically active material while in a given transition state, the driver can controllably alternate between a delivery phase when the driver is delivering a drive signal to the electrically controllable optically active material and an idle phase when the driver is not delivering a drive signal to the electrically controllable optically active material. The privacy structure containing the electrically controllable optically active material can hold the transition state established as of when the driver ceased delivering power (a drive signal) to the privacy structure over a period of time until the driver again delivers a drive signal to the privacy structure. By continuously alternating between a drive phase when the driver is delivering power (a drive signal) to the privacy structure and an idle phase when the driver is not delivering power to the privacy structure, the power consumption of the structure is reduced as compared to when the driver is continuously delivering power to the structure.

In some examples, the duration of the drive phase when the driver is delivering power to the privacy structure ranges from 0.1 millisecond to 10 seconds. Additionally or alternatively, the duration of the idle phase when the driver is not delivering power to the privacy structure yet the privacy structure maintains the transition state present when the driver ceased delivering power ranges from 1 second to 10,000 seconds, such as from 1 second to 5,000 seconds, or from 300 seconds to 5,000 seconds. A ratio of the duration of the idle period divided by the duration of the drive period may be greater than 1, such as from greater than 10, greater than 100, greater than 1000, or greater than 2500.

The duration of the idle phase for a particular privacy structure may vary based on factors related to the quality (e.g., cleanliness) of its initial construction as well as transients of its environment (e.g., size, purity, temperature, age). In general, a smaller, newer, more pure panel in a cooler climate will have a longer duration time than a comparatively larger, older, less pure panel in a hotter climate.

In some examples, the electrically controllable optically active material is a liquid crystal material. While a variety of different types of liquid crystal materials may be used, in some applications, the liquid crystal material is a monostable liquid crystal, e.g., having one energetically preferred transition state. The monostable state of the liquid crystal may be a privacy (e.g., scattering) state whereas the corresponding non-stable state of the liquid crystal may be a clear state. In these examples, the transition state maintained by the privacy glazing structure during the idle phase can be the clear state. In other words, the driver can transition the liquid crystal in the privacy glazing structure from its stable state to its non-stable state (e.g., clear state) and maintain that non-stable optical state through alternating application of drive phases and idle phases. In another example, the monostable state of the liquid crystal may be a clear state whereas the corresponding non-stable state of the liquid crystal may be a privacy (e.g., scattering) state. In this example, the transition state maintained by the privacy glazing structure during the idle phase can be the privacy state. The driver can transition the liquid crystal in the privacy glazing structure from its stable state to its non-stable state (e.g., privacy state) and maintain that non-stable optical state through alternating application of drive phases and idle phases.

In some examples, the non-stable state may be desired while the privacy panel is in an idle phase or a delivery phase. To achieve the non-stable state, the driver may externally short circuit the electrodes to discharge from an applied or working voltage down to a zero voltage state. This discharge process may occur in less than 10 seconds from an initial input, such as from an applied voltage of 60V or more down to 0V in 500 milliseconds or less. If switching is desired during a driving phase, the input applied voltage potential from the driver is first removed.

During each drive phase, the driver can drive the liquid crystal at a frequency and a waveform appropriate for the specific liquid crystal used. The waveform used may be an alternating current waveform, a direct current waveform, or a hybrid alternating current and direct current waveform. The waveform can have an operating amplitude and a polarity which, in the case of alternating current, alternates. When transitioning from a drive phase to an ideal phase, the drive signal can be terminated while the waveform is at is maximum operating amplitude. The polarity of the waveform, however, will be reversed for each subsequent transition. For example, in the case where the privacy structure is driven with a 60 volt alternating current waveform, the drive may initially transition from a drive phase to an idle phase when the current is positive 60 volts. Following a idle phase, the driver may drive the liquid crystal for a period of time and then transition from a second drive phase to a second idle phase when the current is negative 60 volts. The driver may be physically disconnected from the optically active material (e.g., by opening a switch) when transitioning from a drive phase to an idle phase.

The details of one or more examples are set forth in the accompanying drawings and the description below. Other features, objects, and advantages will be apparent from the description and drawings, and from the claims.

BRIEF DESCRIPTION OF DRAWINGS

FIG. 6 illustrates an example hybrid waveform.

DETAILED DESCRIPTION

In general, the present disclosure is directed to electrical control systems, devices, and methods for controlling optical structures having controllable light modulation. For example, an optical structure may include an electrically controllable optically active material that provides controlled transition between a privacy or scattering state and a visible or transmittance state. An electrical controller, or driver, may be electrically coupled to optically active material through electrode layers bounding the optically active material. The electrical driver may receive power from a power source and condition the electricity received from the power source, e.g., by changing the frequency, amplitude, waveform, and/or other characteristic of the electricity received from the power source. The electrical driver can deliver the conditioned electrical signal to the electrodes. In addition, in response to a user input or other control information, the electrical driver may change the conditioned electrical signal delivered to the electrodes and/or cease delivering electricity to the electrodes. Accordingly, the electrical driver can control the electrical signal delivered to the optically active material, thereby controlling the material to maintain a specific optical state or to transition from one state (e.g., a transparent state or scattering state) to another state.

An electrical driver according to the disclosure may periodically switch the polarity of the electricity of the delivered to the privacy structure. This periodic polarity reversal can help prevent ions within the electrically controllable optically active material from preferentially migrating toward one electrode layer, which is a phenomenon sometimes referred to as ion plating. In some examples, the driver includes hardware and/or software controlling the frequency at which polarity switching occurs. In operation, the driver can maintain a particular transition state of the privacy glazing containing an electrically controllable optically active material by alternating between delivering a drive signal (power) to the electrically controllable optically active material and an intervening idle period when no power is delivered to the electrically controllable optically active material. The electrically controllable optically active material can function as a capacitor, holding its electrical charge during the idle period between adjacent drive periods. Accordingly, by alternating between drive periods and idle periods in which no power is delivered to the electrically controllable optically active material, the power consumption of the privacy structure is greatly reduced.

Figure 1:
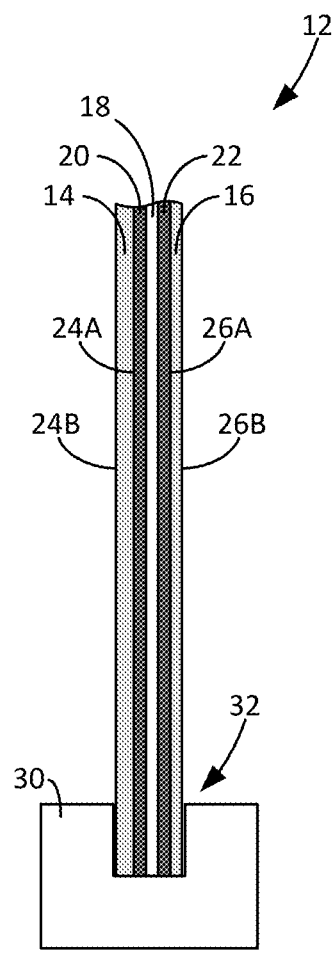
FIG. 1 is a side view of an example privacy glazing structure.

FIG. 1 is a side view of an example privacy glazing structure 12 that includes a first pane of transparent material 14 and a second pane of transparent material 16 with a layer of optically active material 18 bounded between the two panes of transparent material. The privacy glazing structure 12 also includes a first electrode layer 20 and a second electrode layer 22. The first electrode layer 20 is carried by the first pane of transparent material 14 while the second electrode layer 22 is carried by the second pane of transparent material. In operation, electricity supplied through the first and second electrode layers 20, 22 can control the optically active material 18 to control visibility through the privacy glazing structure.

Privacy glazing structure 12 can utilize any suitable privacy materials for the layer of optically active material 18. Further, although optically active material 18 is generally illustrated and described as being a single layer of material, it should be appreciated that a structure in accordance with the disclosure can have one or more layers of optically active material with the same or varying thicknesses. In general, optically active material 18 is configured to provide controllable and reversible optical obscuring and lightening. Optically active material 18 can be an electronically controllable optically active material that changes direct visible transmittance in response to changes in electrical energy applied to the material.

In one example, optically active material 18 is formed of an electrochromic material that changes opacity and, hence, light transmission properties, in response to voltage changes applied to the material. Typical examples of electrochromic materials are $WO_3$ and $MoO_3$, which are usually colorless when applied to a substrate in thin layers. An electrochromic layer may change its optical properties by oxidation or reduction processes. For example, in the case of tungsten oxide, protons can move in the electrochromic layer in response to changing voltage, reducing the tungsten oxide to blue tungsten bronze. The intensity of coloration is varied by the magnitude of charge applied to the layer.

In another example, optically active material 18 is formed of a liquid crystal material. Different types of liquid crystal materials that can be used as optically active material 18 include polymer dispersed liquid crystal (PDLC) materials and polymer stabilized cholesteric texture (PSCT) materials. Polymer dispersed liquid crystals usually involve phase separation of nematic liquid crystal from a homogeneous liquid crystal containing an amount of polymer, sandwiched between electrode layers 20 and 22. When the electric field is off, the liquid crystals may be randomly scattered. This scatters light entering the liquid crystal and diffuses the transmitted light through the material. When a certain voltage is applied between the two electrode layers, the liquid crystals may homeotropically align and the liquid crystals increase in optical transparency, allowing light to transmit through the crystals.

In the case of polymer stabilized cholesteric texture (PSCT) materials, the material can either be a normal mode polymer stabilized cholesteric texture material or a reverse mode polymer stabilized cholesteric texture material. In a normal polymer stabilized cholesteric texture material, light is scattered when there is no electrical field applied to the material. If an electric field is applied to the liquid crystal, it turns to the homeotropic state, causing the liquid crystals to reorient themselves parallel in the direction of the electric field. This causes the liquid crystals to increase in optical transparency and allows light to transmit through the liquid crystal layer. In a reverse mode polymer stabilized cholesteric texture material, the liquid crystals are transparent in the absence of an electric field (e.g., zero electric field) but opaque and scattering upon application of an electric field.

In one example in which the layer of optically active material 18 is implemented using liquid crystals, the optically active material includes liquid crystals and a dichroic dye to provide a guest-host liquid crystal mode of operation. When so configured, the dichroic dye can function as a guest compound within the liquid crystal host. The dichroic dye can be selected so the orientation of the dye molecules follows the orientation of the liquid crystal molecules. In some examples, when an electric field is applied to the optically active material 18, there is little to no absorption in the short axis of the dye molecule, and when the electric field is removed from the optically active material, the dye molecules absorb in the long axis. As a result, the dichroic dye molecules can absorb light when the optically active material is transitioned to a scattering state. When so configured, the optically active material may absorb light impinging upon the material to prevent an observer on one side of privacy glazing structure 12 from clearly observing activity occurring on the opposite side of the structure.

When optically active material 18 is implemented using liquid crystals, the optically active material may include liquid crystal molecules within a polymer matrix. The polymer matrix may or may not be cured, resulting in a solid or liquid medium of polymer surrounding liquid crystal molecules. In addition, in some examples, the optically active material 18 may contain spacer beads (e.g., micro-spheres), for example having an average diameter ranging from 3 micrometers to 40 micrometers, to maintain separation between the first pane of transparent material 14 and the second pane of transparent material 16.

In another example in which the layer of optically active material 18 is implemented using a liquid crystal material, the liquid crystal material turns hazy when transitioned to the privacy state. Such a material may scatter light impinging upon the material to prevent an observer on one side of privacy glazing structure 12 from clearly observing activity occurring on the opposite side of the structure. Such a material may significantly reduce regular visible transmittance through the material (which may also be referred to as direct visible transmittance) while only minimally reducing total visible transmittance when in the privacy state, as compared to when in the light transmitting state. When using these materials, the amount of scattered visible light transmitting through the material may increase in the privacy state as compared to the light transmitting state, compensating for the reduced regular visible transmittance through the material. Regular or direct visible transmittance may be considered the transmitted visible light that is not scattered or redirected through optically active material 18.

Another type of material that can be used as the layer of optically active material 18 is a suspended particle material. Suspended particle materials are typically dark or opaque in a non-activated state but become transparent when a voltage is applied. Other types of electrically controllable optically active materials can be utilized as optically active material 18, and the disclosure is not limited in this respect.

Independent of the specific type of material(s) used for the layer of optically active material 18, the material can change from a light transmissive state in which privacy glazing structure 12 is intended to be transparent to a privacy state in which visibility through the insulating glazing unit is intended to be blocked. Optically active material 18 may exhibit progressively decreasing direct visible transmittance when transitioning from a maximum light transmissive state to a maximum privacy state. Similarly, optically active material 18 may exhibit progressively increasing direct visible transmittance when transitioning from a maximum privacy state to a maximum transmissive state. The speed at which optically active material 18 transitions from a generally transparent transmission state to a generally opaque privacy state may be dictated by a variety of factors, including the specific type of material selected for optically active material 18, the temperature of the material, the electrical voltage applied to the material, and the like.

To electrically control optically active material 18, privacy glazing structure 12 in the example of FIG. 1 includes first electrode layer 20 and second electrode layer 22. Each electrode layer may be in the form of an electrically conductive coating deposited on or over the surface of each respective pane facing the optically active material 18. For example, first pane of transparent material 14 may define an inner surface 24A and an outer surface 24B on an opposite side of the pane. Similarly, second pane of transparent material 16 may define an inner surface 26A and an outer surface 26B on an opposite side of the pane. First electrode layer 20 can be deposited over the inner surface 24A of the first pane, while second electrode layer 22 can be deposited over the inner surface 26A of the second pane. The first and second electrode layers 20, 22 can be deposited directed on the inner surface of a respective pane or one or more intermediate layers, such as a blocker layer, and be deposited between the inner surface of the pane and the electrode layer.

Each electrode layer 20, 22 may be an electrically conductive coating that is a transparent conductive oxide ("TCO") coating, such as aluminum-doped zinc oxide and/or tin-doped indium oxide. The transparent conductive oxide coatings can be electrically connected to a power source, e.g., via a bus bar or other electrical connector structure. In some examples, the transparent conductive coatings forming electrode layers 20, 22 define wall surfaces of a cavity between first pane of transparent material 14 and second pane of transparent material 16 which optically active material 18 contacts. In other examples, one or more other coatings may overlay the first and/or second electrode layers 20, 22, such as a dielectric overcoat (e.g., silicon oxynitride, silicon oxide, polyimide, silicon oxide/polyimide multilayer). In either case, first pane of transparent material 14 and second pane of transparent material 16, as well as any coatings on inner faces 24A, 26A of the panes can form a cavity or chamber containing optically active material 18.

When a dielectric overcoat is used, the dielectric overcoat (be it formed of a single layer or multiple layers) may have a dielectric constant greater than 2, such as greater than 5, or greater than 10. Additionally or alternatively, the dielectric overcoat may have a dielectric strength of greater than $3\times10^5$ (volts/centimeter), such as greater than $3\times10^7$ (V/cm) and a dielectric loss less than 0.05, such as less than 0.03, or less than 0.01. The dielectric overcoat could be sputtered deposited or applied as a coated film.

The panes of transparent material forming privacy glazing structure 12, including first pane 14 and second pane 16, can be formed of any suitable material. Each pane of transparent material may be formed from the same material, or at least one of the panes of transparent material may be formed of a material different than at least one other of the panes of transparent material. In some examples, at least one (and optionally all) the panes of privacy glazing structure 12 are formed of glass. In other examples, at least one (and optionally all) the privacy glazing structure 12 are formed of plastic such as, e.g., a fluorocarbon plastic, polypropylene, polyethylene, or polyester. When glass is used, the glass may be aluminum borosilicate glass, sodium-lime (e.g., sodium-lime-silicate) glass, or another type of glass. In addition, the glass may be clear or the glass may be colored, depending on the application. Although the glass can be manufactured using different techniques, in some examples the glass is manufactured on a float bath line in which molten glass is deposited on a bath of molten tin to shape and solidify the glass. Such an example glass may be referred to as float glass.

In some examples, first pane 14 and/or second pane 16 may be formed from multiple different types of materials. For example, the substrates may be formed of a laminated glass, which may include two panes of glass bonded together with a polymer such as polyvinyl butyral. Additional details on privacy glazing substrate arrangements that can be used in the present disclosure can be found in US Patent Publication No. US2018/0307111, titled "HIGH PERFORMANCE PRIVACY GLAZING STRUCTURES" and filed Apr. 20, 2018, the entire contents of which are incorporated herein by reference. In addition, further details on driver hardware and/or software that can be used with privacy glazing arrangements according to the present disclosure can be found in in US Patent Publication No. US2019/0346710, titled "ELECTRICALLY CONTROLLABLE PRIVACY GLAZING WITH ENERGY RECAPTURING DRIVER" and filed May 9, 2019, the entire contents of which are incorporated herein by reference.

Privacy glazing structure 12 can be used in any desired application, including in a door, a window, a wall (e.g., wall partition), a skylight in a residential or commercial building, or in other applications. To help facilitate installation of privacy glazing structure 12, the structure may include a frame 30 surrounding the exterior perimeter of the structure. In different examples, frame 30 may be fabricated from wood, metal, or a plastic material such a vinyl. Frame 30 may define a channel 32 that receives and holds the external perimeter edge of structure 12. The sightline through privacy glazing structure 12 is generally established as the location where frame 30 end and visibility through privacy glazing structure 12 begins.

Figure 2:
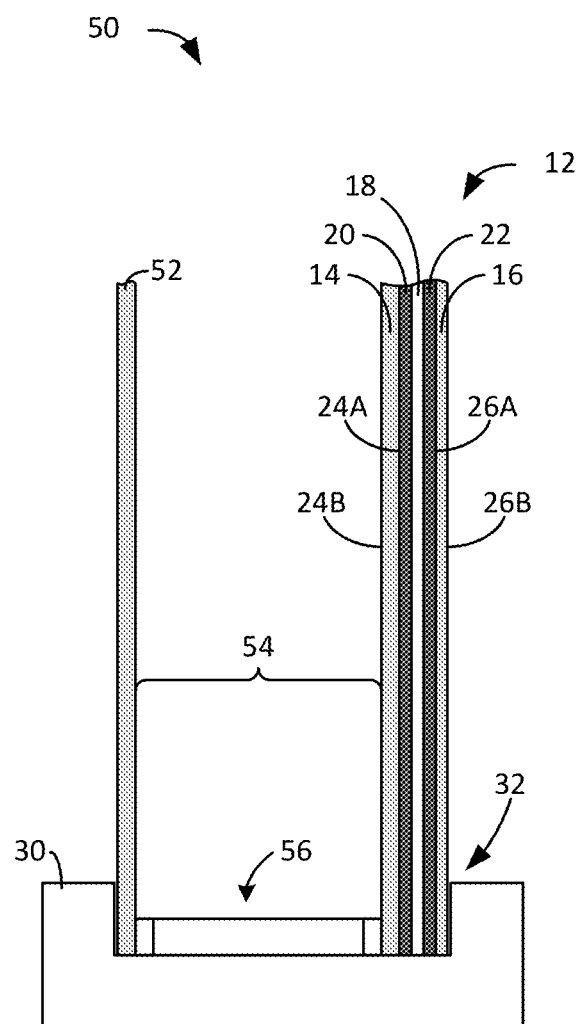
FIG. 2 is a side view of the example privacy glazing structure of FIG. 1 incorporated into a multi-pane insulating glazing unit.

In the example of FIG. 1, privacy glazing structure 12 is illustrated as a privacy cell formed of two panes of transparent material bounding optically active material 18. In other configurations, privacy glazing structure 12 may be incorporated into a multi-pane glazing structure that include a privacy cell having one or more additional panes separated by one or more between-pane spaces. FIG. 2 is a side view of an example configuration in which privacy glazing structure 12 from FIG. 1 is incorporated into a multi-pane insulating glazing unit having a between-pane space.

As shown in the illustrated example of FIG. 2, a multi-pane privacy glazing structure 50 may include privacy glazing structure 12 separated from an additional (e.g., third) pane of transparent material 52 by a between-pane space 54, for example, by a spacer 56. Spacer 56 may extend around the entire perimeter of multi-pane privacy glazing structure 50 to hermetically seal the between-pane space 54 from gas exchange with a surrounding environment. To minimize thermal exchange across multi-pane privacy glazing structure 50, between-pane space 54 can be filled with an insulative gas or even evacuated of gas. For example, between-pane space 54 may be filled with an insulative gas such as argon, krypton, or xenon. In such applications, the insulative gas may be mixed with dry air to provide a desired ratio of air to insulative gas, such as 10 percent air and 90 percent insulative gas. In other examples, between-pane space 54 may be evacuated so that the between-pane space is at vacuum pressure relative to the pressure of an environment surrounding multi-pane privacy glazing structure 50.

Spacer 56 can be any structure that holds opposed substrates in a spaced apart relationship over the service life of multi-pane privacy glazing structure 50 and seals between-pane space 54 between the opposed panes of material, e.g., so as to inhibit or eliminate gas exchange between the between-pane space and an environment surrounding the unit. One example of a spacer that can be used as spacer 56 is a tubular spacer positioned between first pane of transparent material 14 and third pane of transparent material 52. The tubular spacer may define a hollow lumen or tube which, in some examples, is filled with desiccant. The tubular spacer may have a first side surface adhered (by a first bead of sealant) to the outer surface 24B of first pane of transparent material 14 and a second side surface adhered (by a second bead of sealant) to third pane of transparent material 52. A top surface of the tubular spacer can exposed to between-pane space 54 and, in some examples, includes openings that allow gas within the between-pane space to communicate with desiccating material inside of the spacer. Such a spacer can be fabricated from aluminum, stainless steel, a thermoplastic, or any other suitable material.

Another example of a spacer that can be used as spacer 56 is a spacer formed from a corrugated metal reinforcing sheet surrounded by a sealant composition. The corrugated metal reinforcing sheet may be a rigid structural component that holds first pane of transparent material 14 apart from third pane of transparent material 52. In yet another example, spacer 56 may be formed from a foam material surrounded on all sides except a side facing a between-pane space with a metal foil. As another example, spacer 56 may be a thermoplastic spacer (TPS) spacer formed by positioning a primary sealant (e.g., adhesive) between first pane of transparent material 14 and third pane of transparent material 52 followed, optionally, by a secondary sealant applied around the perimeter defined between the substrates and the primary sealant. Spacer 56 can have other configurations, as will be appreciated by those of ordinary skill in the art.

Depending on the application, first patent of transparent material 14, second pane of transparent material 16, and/or third pane of transparent material 52 (when included) may be coated with one or more functional coatings to modify the performance of privacy structure. Example functional coatings include, but are not limited to, low-emissivity coatings, solar control coatings, and photocatalytic coatings. In general, a low-emissivity coating is a coating that is designed to allow near infrared and visible light to pass through a pane while substantially preventing medium infrared and far infrared radiation from passing through the panes. A low-emissivity coating may include one or more layers of infrared-reflection film interposed between two or more layers of transparent dielectric film. The infrared-reflection film may include a conductive metal like silver, gold, or copper. A photocatalytic coating, by contrast, may be a coating that includes a photocatalyst, such as titanium dioxide. In use, the photocatalyst may exhibit photoactivity that can help self-clean, or provide less maintenance for, the panes.

The electrode layers 20, 22 of privacy glazing structure 12, whether implemented alone or in the form of a multiple-pane structure with a between-pane space, can be electrically connected to a driver. The driver can provide power and/or control signals to control optically active material 18. In some configurations, wiring is used to establish electrical connection between the driver and each respective electrode layer. A first wire can provide electrical communication between the driver and the first electrode layer 20 and a second wire can provide electrical communication between the driver and the second electrode layer 22. In general, the term wiring refers to any flexible electrical conductor, such as a thread of metal optionally covered with an insulative coating, a flexible printed circuit, a bus bar, or other electrical connector facilitating electrical connection to the electrode layers.

Figure 3:
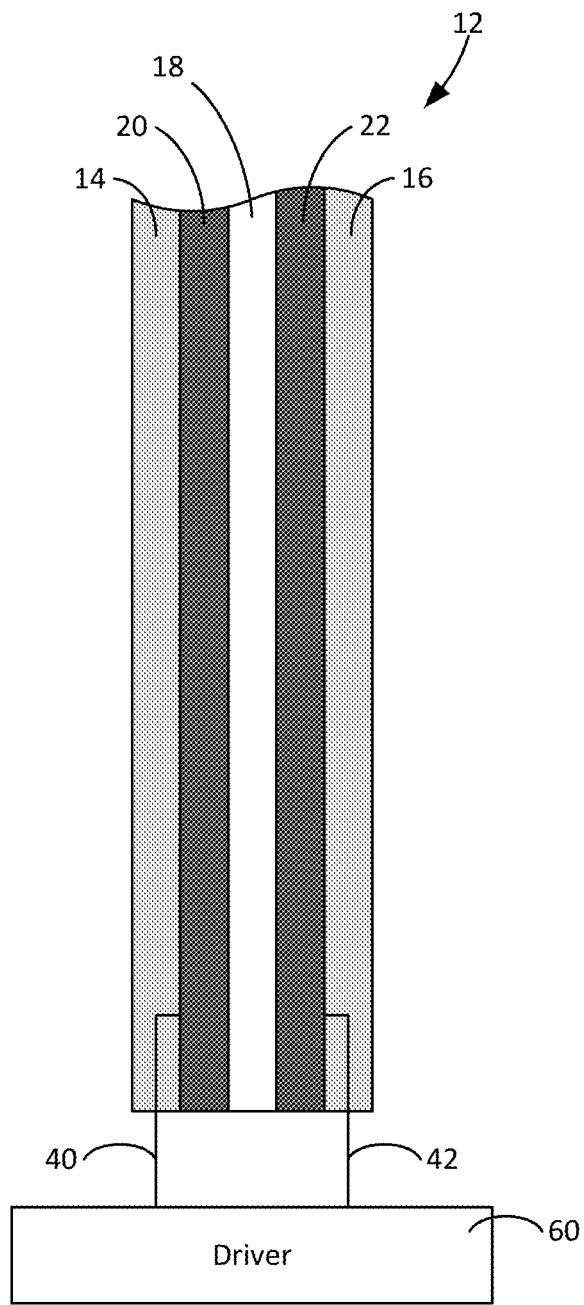
FIG. 3 is an exemplary schematic illustration showing an example connection arrangement of a driver to electrode layers of a privacy structure.

FIG. 3 is a schematic illustration showing an example connection arrangement between a driver and electrode layers of a privacy structure. In the illustrated example, wires 40 and 42 electrically couple driver 60 to the first electrode layer 20 and the second electrode layer 22, respectively. In some examples, wire 40 and/or wire 42 may connect to their respective electrode layers via a conduit or hole in the transparent pane adjacent the electrode layer. In other configurations, wire 40 and/or wire 42 may contact their respective electrode layers at the edge of the privacy structure 12 without requiring wire 40 and/or wire 42 to extend through other sections (e.g., transparent panes 14, 16) to reach the respective electrode layer(s). In either case, driver 60 may be electrically coupled to each of electrode layers 20 and 22.

In operation, the driver 60 can apply a voltage difference between electrode layers 20 and 22, resulting in an electric field across optically active material 18. The optical properties of the optically active material 18 can be adjusted by applying a voltage across the layer. In some embodiments, the effect of the voltage on the optically active material 18 is independent on the polarity of the applied voltage. For example, in some examples in which optically active material 18 comprises liquid crystals that align with an electric field between electrode layers 20 and 22, the optical result of the crystal alignment is independent of the polarity of the electric field. For instance, liquid crystals may align with an electric field in a first polarity and may rotate approximately 180° in the event the polarity if reversed. However, the optical state of the liquid crystals (e.g., the opacity) in either orientation may be approximately the same.

Figure 4:
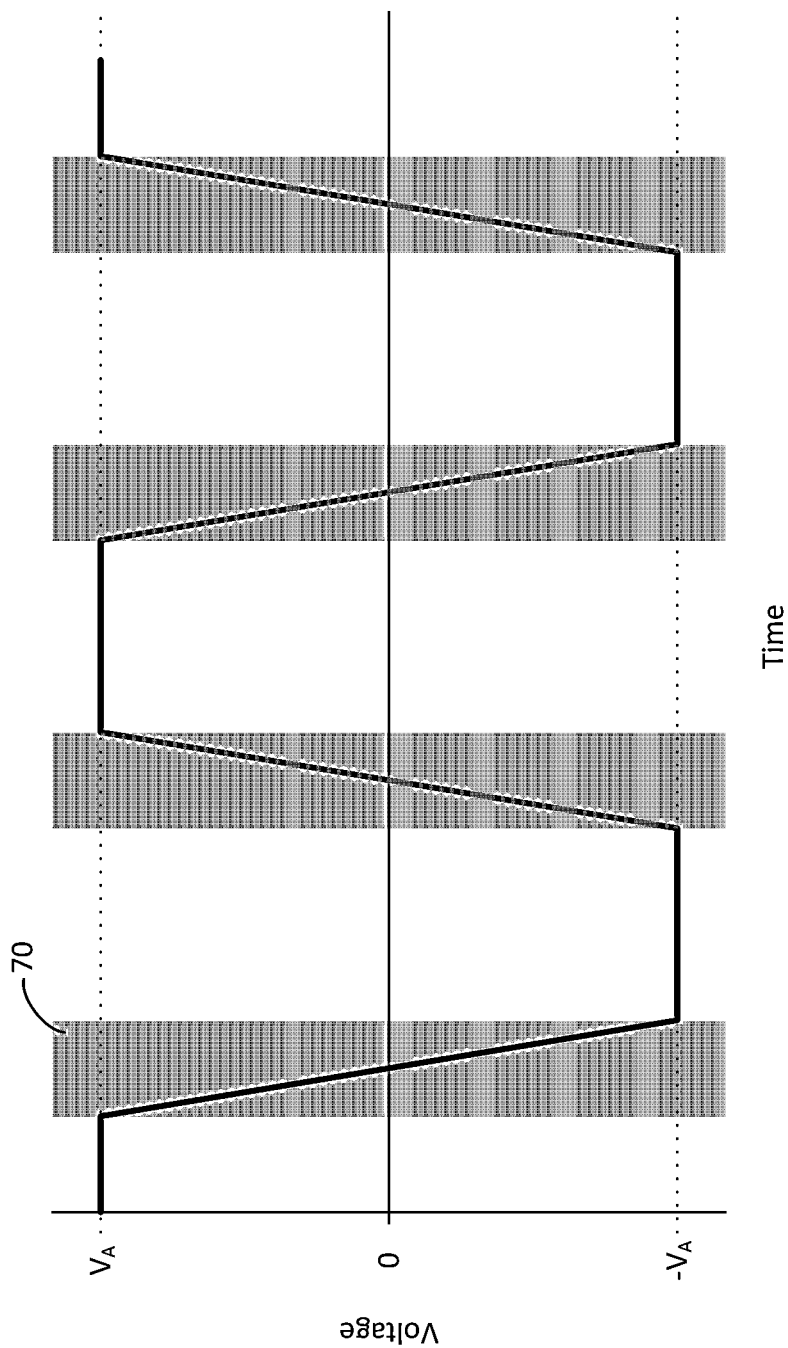
FIG. 4 shows an exemplary driver signal applied between a first electrode layer and a second electrode layer over time.

FIG. 4 shows an example alternating current drive signal that may be applied between first electrode layer 20 and second electrode layer 22 over time. It will be appreciated that the signal of FIG. 4 is exemplary and is used for illustrative purposes, and that any variety of signals applied from the driver may be used. In the example of FIG. 4, a voltage signal between the first electrode layer and the second electrode layer produced by the driver varies over time between applied voltages $V_A$ and $-V_A$. In other words, in the illustrated example, a voltage of magnitude $V_A$ is applied between the first and second electrode layers, and the polarity of the applied voltage switches back and forth over time. The optical state (e.g., either transparent or opaque) of optically active layer 18 may be substantially unchanging while the voltage is applied to the optically active layer even though the voltage applied to the layer is varying over time. The optical state may be substantially unchanging in that the unaided human eye may not detect changes to optically active layer 18 in response to the alternating polarity of the current. However, optically active layer 18 may change state (e.g., from transparent to opaque) if the driver stops delivering power to the optically active layer.

As shown in the example of FIG. 4, the voltage does not immediately reverse polarity from $V_A$ to $-V_A$. Instead, the voltage changes polarity over a transition time 70 (shaded). In some examples, a sufficiently long transition time may result in an observable transition of the optically active material between polarities. For instance, in an exemplary embodiment, liquid crystals in an optically active material may align with an electric field to create a substantially transparent structure and become substantially opaque when the electric field is removed. Thus, when transitioning from $V_A$ (transparent) to $-V_A$ (transparent), a slow enough transition between $V_A$ and $-V_A$ may result in an observable optical state (e.g., opaque or partially opaque) when $-V_A < V < V_A$ (e.g., when $|V| \ll V_A$). On the other hand, a fast enough transition between polarities (e.g., from $V_A$ to $-V_A$) may appear to an observer (e.g., to the naked eye in real time) to result in no apparent change in the optical state of the optically active material.

In some examples, if a particular optical state (e.g., a transparent state) is to be maintained, switching between polarities that each correspond to that optical state (e.g., between $+V_A$ and $-V_A$) can prevent damage to the optically active material. For example, in some cases, a static or direct current voltage applied to an optically active material can result in ion plating within the structure, causing optical defects in the structure. To avoid this optical deterioration, a driver for an optically active material (e.g., in an electrically dynamic window such as a privacy structure) can be configured to continuously switch between applied polarities of an applied voltage (e.g. $V_A$) in order to maintain the desired optical state.

In accordance with some examples of the present disclosure, driver 60 can control the privacy glazing structure 12 to maintain a given optical state (e.g., clear state or privacy state) by alternating between a drive phase and an idle phase. During each drive phase, driver 60 can deliver power via a drive signal to first and second electrode layers 20, 22. During each idle phase, driver 60 can suspend (e.g., cease delivering power) to first and second electrode layers 20, 22. Optically active layer 18 can maintain its transition state during each idle phase.

To allow optically active layer 18 to maintain its transition state during each idle phase, privacy glazing structure 12 and optically active layer 18 may be selected and fabricated to have a high voltage holding ratio (VHR). In general, VHR is a measure of the time privacy glazing structure 12 and, more particularly optically active layer 18, transitions from clear to scatter (or vice versa) after voltage is removed. In some examples, privacy glazing structure 12 and/or optically active layer 18 exhibit a VHR of at least 50%, such as at least 75%, or at least 90%.

During or after fabrication of privacy glazing structure 12, the VHR of the structure may be measured and the applied voltage ($V_A$) and/or duration of the idle period selected for controlling the structure may be determined based on measured VHR. For example, the applied voltage ($V_A$) may be increased to allow for a nominal voltage loss during the idle phase. Privacy glazing structure 12 may be characterized as having a threshold voltage ($V_{threshold}$) below which optically active layer 18 transitions from one state to a different state. The applied voltage ($V_A$) delivered may be greater than 120% of $V_{threshold}$ ($V_A > 1.2\ V_{threshold}$), such as greater than 150% of $V_{threshold}$ ($V_A > 1.5 V_{threshold}$), or greater than 200% of $V_{threshold}$ ($V_A > 2 V_{threshold}$).

For example, driver 60 may be configured to periodically measure the VHR of privacy glazing structure 12 and adjust the applied voltage and/or duration of the idle period based on the measured VHR. Driver 60 may periodically sample the floated voltage at a time period just prior to discharging the panel. Each measured sample may incur a penalty or burdened voltage, which may be minimized using a low current sense method.

In some examples, driver 60 delivers a hybrid waveform during each drive phase that can be the main waveform or ultra-low power waveform. The hybrid waveform may include an AC pulse (e.g., square), a continuous DC pulse, and zero-power state or physical-disconnect state (or relay state), which is referred to also as the idle phase. The AC pulse may be is used to mitigate accumulation of impurities in the liquid crystal medium while maintaining the ON state of the appliance. The DC pulse may be is used to minimize power consumption as well as to let the ON state of the appliance to stabilize from any electrical and or optical instabilities. The idle phase can be used to achieve maximum power savings.

For continuous operation of the smart window, the hybrid waveform is applied repeatedly. By changing the amount of time each electrical element applied, the appliance can operate at very low power levels.

Figure 5:
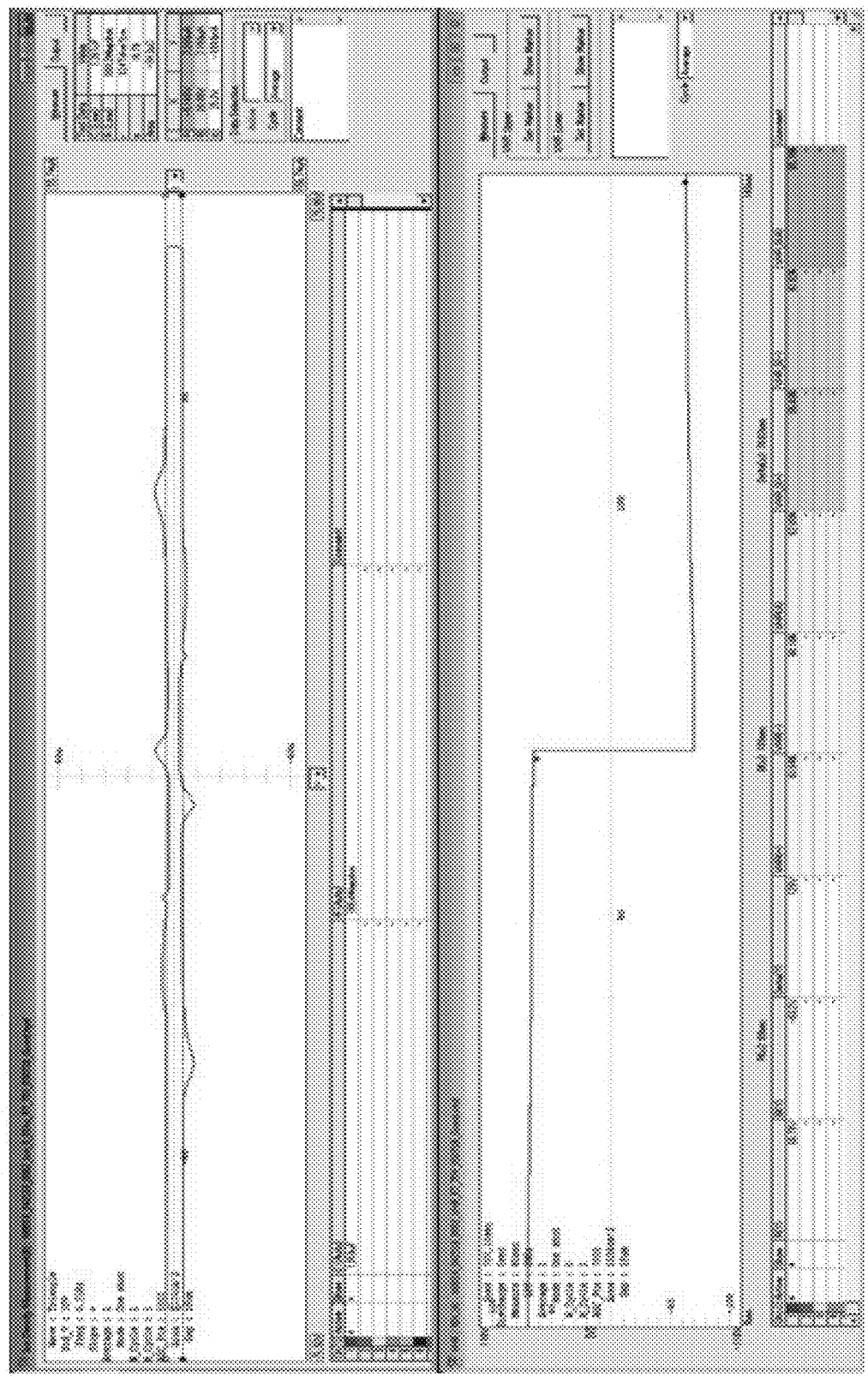
FIG. 5 illustrates example ion density graph data.

FIG. 5 shows an example 14 inch×20 inch smart window capable of operating using the above-disclosed hybrid waveform. The top graph represents the ion density graph where the ion density measurement provides a panel resistance of about 380 megohms and voltage holding ratio from the VHR measurement is 95.16%. However, when the 14 inch×20 inch appliance shows resistance and voltage holding ratios in the one megohm range and 30% range respectively, the quality of the appliance may not be appropriate to utilize the hybrid waveform. Ultra low power waveform is generally applicable to privacy appliances, e.g., characterized by high resistance and high voltage holding ratio. For a 14 inch×20 inch privacy appliance, high resistance and a high voltage holding ratio may be in the range of at least ten of megohm resistance and at least 40%, respectively.

FIG. 6 illustrates an example hybrid waveform where X, Y and Z represent AC, DC and No-powered signal elements.

In some embodiments, a driver for driving an optically active material can include a controller configured to adjust operation of one or more switching mechanisms in a switching network and/or to adjust the voltage applied to the switching mechanisms. In some examples, the controller operates in response to an input from a user interface, such as a command from a user interface to change the optical state of the optically active material.

In various examples, the controller can include one or more components configured to process received information, such as a received input from a user interface, and perform one or more corresponding actions in response thereto. Such components can include, for example, one or more application specific integrated circuits (ASICs), microcontrollers, microprocessors, field-programmable gate arrays (FPGAs), or other appropriate components capable of receiving and output data and/or signals according to a predefined relationship. In some examples, such one or more components can be physically integrated with the other driver components, such as the switching network and the like.

A user interface in communication with the controller can include a switch or other component in wired or wireless communication with the controller. For instance, a hard switch (e.g., a wall switch proximate an optically dynamic window structure) can be coupled to the controller and can switch between two or more switching states, each corresponding to an optical state of the controller optically active material. Additionally or alternatively, the driver may be configured to communicate with an external component, such as a smartphone or tablet via wireless communication or an internet-connected device (e.g., through a hard-wired or wireless network connection). In some embodiments, the controller can receive a signal from such an external device corresponding to a desired optical state of the optically active material, and can control the optically active material accordingly.

Various examples have been described. These and other examples are within the scope of the following claims.

The invention claimed is:

1. An electrically dynamic window structure comprising:
a first pane of transparent material;
a second pane of transparent material;
an electrically controllable optically active material positioned between the first pane of transparent material and the second pane of transparent material, the electrically controllable optically active material being positioned between a first electrode layer and a second electrode layer, the electrically controllably optically active material having a first optical transition state and a second optical transition state, wherein the electrically controllably optically active material is a liquid crystal material having a light transmittance that varies in response to application of an electrical field; and
a driver electrically connectable to the first electrode layer and the second electrode layer,
wherein the driver configured to alternate between a drive phase in which a drive signal is applied to the first electrode layer and the second electrode layer to drive the electrically controllable optically active material to the first optical transition state and an idle phase in which the drive signal is not applied to the first electrode layer and the second electrode layer yet the electrically controllable optically active material maintains the first optical transition state.

2. The structure of claim 1, wherein the driver is configured execute each idle phase for a period ranging from 1 second to 5000 seconds between each drive phase.

3. The structure of claim 1, wherein the driver is configured to execute each drive phase for a period ranging from 1 milliseconds to 10 seconds.

4. The structure of claim 1, wherein the driver is configured execute the drive phase for a duration and the idle phase for a duration such that a ratio of the duration of the idle phase divided by the duration of the drive phase is greater than 1.

5. The structure of claim 4, wherein the ratio is greater than 10.

6. The structure of claim 4, wherein the ratio is greater than 100.

7. The structure of claim 1, wherein the electrically controllable optically active material exhibits a voltage holding ratio of at least 50%.

8. The structure of claim 1, wherein the electrically controllable optically active material exhibits a voltage holding ratio of at least 90%.

9. The structure of claim 1, wherein the liquid crystal material is monostable, having a stable transition state and a non-stable transition state, and the first optical transition state is the non-stable transition state.

10. The structure of claim 9, wherein the non-stable transition state is a privacy state.

11. The structure of claim 9, wherein the non-stable transition state is a clear state.

12. The structure of claim 1, wherein the driver is configured to receive power from a power source, generate a conditioned electrical signal, and supply the conditioned electrical signal to the first electrode layer and the second electrode layer, the power source being wall power delivering alternating current.

13. The structure of claim 1, wherein the driver is configured to receive power from a power source, generate a conditioned electrical signal, and supply the conditioned electrical signal to the first electrode layer and the second electrode layer, the power source being a battery.

14. The structure of claim 1, wherein the driver comprises a controller that is configured to receive input from a user control located outside of the electrically dynamic window structure.

15. The structure of claim 1, wherein the first pane of transparent material and the second pane of transparent material are each fabricated from float glass.

16. The structure of claim 1, wherein the first electrode layer comprises a transparent conductive oxide coating deposited over the first pane of transparent material and the second electrode layer comprises a transparent conductive oxide coating deposited over the second pane of transparent material.

17. The structure of claim 1, further comprising a dielectric overcoat overlaying at least one of the first electrode layer and the second electrode layer.

18. The structure of claim 17, wherein the dielectric overcoat has a dielectric strength of greater than $3 \times 10^5$ volts/centimeter.

19. The structure of claim 17, wherein the dielectric overcoat comprises silicon oxide.

20. The structure of claim 1, further comprising:
a third pane of transparent material; and
a spacer separating the third pane of transparent material from the first pane of transparent material and defining a sealed gas space therebetween.

* * * * *